(12) United States Patent
Masamura

(10) Patent No.: US 7,946,399 B2
(45) Date of Patent: May 24, 2011

(54) HYDRAULIC SHOCK ABSORBER

(75) Inventor: Tatsuya Masamura, Tokyo (JP)

(73) Assignee: Kayaba Industry Co., Ltd., Tokyo (JP)

( * ) Notice: Subject to any disclaimer, the term of this patent is extended or adjusted under 35 U.S.C. 154(b) by 1260 days.

(21) Appl. No.: 11/578,166

(22) PCT Filed: Apr. 26, 2005

(86) PCT No.: PCT/JP2005/008386
§ 371 (c)(1),
(2), (4) Date: Oct. 11, 2006

(87) PCT Pub. No.: WO2005/103523
PCT Pub. Date: Nov. 3, 2005

(65) Prior Publication Data
US 2007/0209892 A1 Sep. 13, 2007

(30) Foreign Application Priority Data
Apr. 26, 2004 (JP) .................................. 2004-129481

(51) Int. Cl.
*F16F 9/348* (2006.01)
(52) U.S. Cl. .............. 188/282.4; 188/322.15; 188/299.1
(58) Field of Classification Search .................. 188/266, 188/266.1, 266.2, 281, 282.1, 282.2, 282.8, 188/282.4, 322.15, 299.1
See application file for complete search history.

(56) References Cited

U.S. PATENT DOCUMENTS

| | | | | |
|---|---|---|---|---|
| 6,003,644 A | * | 12/1999 | Tanaka ........................ | 188/266.5 |
| 6,374,967 B2 | * | 4/2002 | Matsumoto et al. .......... | 188/280 |
| 6,668,986 B2 | * | 12/2003 | Moradmand et al. ......... | 188/267 |
| 6,729,446 B2 | * | 5/2004 | Sakai et al. ................ | 188/266.2 |

(Continued)

FOREIGN PATENT DOCUMENTS
EP 0504624 9/1992
(Continued)

*Primary Examiner* — Bradley T King
*Assistant Examiner* — Thomas Irvin
(74) *Attorney, Agent, or Firm* — Rabin & Berdo, PC

(57) ABSTRACT

Provided is a hydraulic shock absorber enabling an increase in a variable range of both damping forces produced in an extension stroke and a compression stroke thereof. A cylinder (1) filled with hydraulic oil is divided into first and second oil chambers (101) and (102) by a piston (2), and a main valve (4) is disposed in a main passage (81) of the piston (2). An extension side pilot chamber (6) urging a spool (8) in a valve-closing direction at pilot pressure introduced thereinto through a first orifice (32) in the extension stroke and a compression-side pilot chamber (7) urging the spool (8) in the valve-closing direction at pilot pressure introduced thereinto through a second orifice (43) in the compression stroke are formed at a back face of the spool (8) of the main valve. Also, the shock absorber comprises a pressure-receiving portion for receiving high pressure in the extension stroke and urging the spool (8) in a valve-opening direction against the pilot pressure and a pressure-receiving portion for receiving high pressure in the compression stroke and urging the spool (8) in the valve-opening direction against the pilot pressure. In addition, the shock absorber comprises an extension-side poppet valve (11) for regulating the pilot pressure in the extension stroke, a compression-side poppet valve (10) for regulating the pilot pressure in the compression stroke, and a solenoid (71) for urging to reduce initial loads of springs (9) of the extension-side and compression-side poppet valves (11) and (10) by passing current therethrough.

8 Claims, 6 Drawing Sheets

U.S. PATENT DOCUMENTS

2002/0179388 A1* 12/2002 Moradmand et al. ..... 188/322.13
2003/0132073 A1*  7/2003 Nakadate ................... 188/282.2

FOREIGN PATENT DOCUMENTS

| | | |
|---|---|---|
| EP | 0508466 | 10/1992 |
| EP | 0942195 | 9/1999 |
| JP | 05-071568 | 3/1993 |
| JP | 05-180260 | 7/1993 |
| JP | 11-072133 | 3/1999 |
| JP | 2002-364697 | 12/2002 |

* cited by examiner

STATE IN WHICH SPOOL HAS NOT BEEN OPENED

STATE IN WHICH SPOOL HAS BEEN OPENED

STATE IN WHICH SPOOL HAS NOT BEEN OPENED

STATE IN WHICH SPOOL HAS BEEN OPENED

HYDRAULIC SHOCK ABSORBER

TECHNICAL FIELD

This invention relates to a hydraulic shock absorber of an adjustable damping force type, which is utilized as a suspension system for a vehicle such as an automobile.

BACKGROUND ART

This type of hydraulic shock absorber is disclosed in JP 11-72133 A.

This hydraulic shock absorber can variably control damping forces generated in an extension stroke and a compression stroke independently of each other.

In this case, while a spool for generating a damping force is urged through pilot pressure set by a poppet valve in the extension stroke, the spool is directly urged by a spring in the compression stroke. A magnetic force of a solenoid is applied in such a direction as to reduce an urging force of the spring, so the damping force can be variably controlled based on current through the solenoid.

DISCLOSURE OF THE INVENTION

In a conventional hydraulic shock absorber, however, the spool for changing the damping force as described above is urged through the pilot pressure in the extension stroke, but directly urged by the spring in the compression stroke. Therefore, a variable range of the damping force in the compression stroke depends only on the spring. Consequently, there is a problem in that a wide variable range cannot be ensured.

It is an object of this invention to provide a hydraulic shock absorber ensuring a wide variable range of the damping force in the compression stroke as well as in the extension stroke.

A hydraulic shock absorber according to this invention includes: a cylinder filled with hydraulic oil; a piston disposed slidably within the cylinder, for dividing an inside of the cylinder into a first oil chamber and a second oil chamber; and a main valve composed of a spool and a disc on which the spool is seated, the main valve being provided on the piston and disposed in a main passage through which the first oil chamber and the second oil chamber communicate with each other. Further, the hydraulic shock absorber includes: an extension-side pilot chamber formed in a back face of the spool, for urging the spool in a valve-closing direction through pilot pressure introduced via a first orifice from the either oil chamber which is at high pressure in an extension stroke; a compression-side pilot chamber formed in the back face of the spool, for urging the spool in the valve-closing direction through a pilot pressure introduced via a second orifice from the either oil chamber which is at high pressure in a compression stroke; an extension-side pressure-receiving portion provided on the spool and having a smaller pressure-receiving area than the extension-side pilot chamber, for allowing pressure to be introduced into the extension-side pressure-receiving portion from an oil chamber which is at high pressure in the extension stroke and urging the spool in a valve-opening direction against the extension-side pilot pressure; a compression-side pressure-receiving portion provided on the spool and having a smaller pressure-receiving area than the compression-side pilot chamber, for allowing pressure to be introduced into the compression-side pressure-receiving portion from an oil chamber which is at high pressure in the compression stroke and urging the spool in the valve-opening direction against the compression-side pilot pressure; an extension-side poppet valve which opens when pressure in the extension-side pilot chamber reaches cracking pressure and holding the pilot pressure substantially below the cracking pressure; a compression-side poppet valve which opens when pressure in the compression-side pilot chamber reaches cracking pressure and holding the pilot pressure substantially below the cracking pressure; and a solenoid for allowing a current to flow therethrough to be excited and applying an urging force in such a direction that the solenoid reduces initial loads of springs of the extension-side poppet valve and the compression-side poppet valve.

According to this invention, the extension-side pilot chamber and the compression-side pilot chamber, which are independent of each other, are provided on the back face side of the spool, and the pressures in the respective pilot chambers are controlled by the two independent poppet valves. Therefore, a damping force can be ensured of a wide variable range not only in the extension stroke but also in the compression stroke, and the variable range of the damping force in the extension stroke and the variable range of the damping force in the compression stroke can be set independently of each other.

BEST MODE FOR CARRYING OUT THE INVENTION

Figure 1:
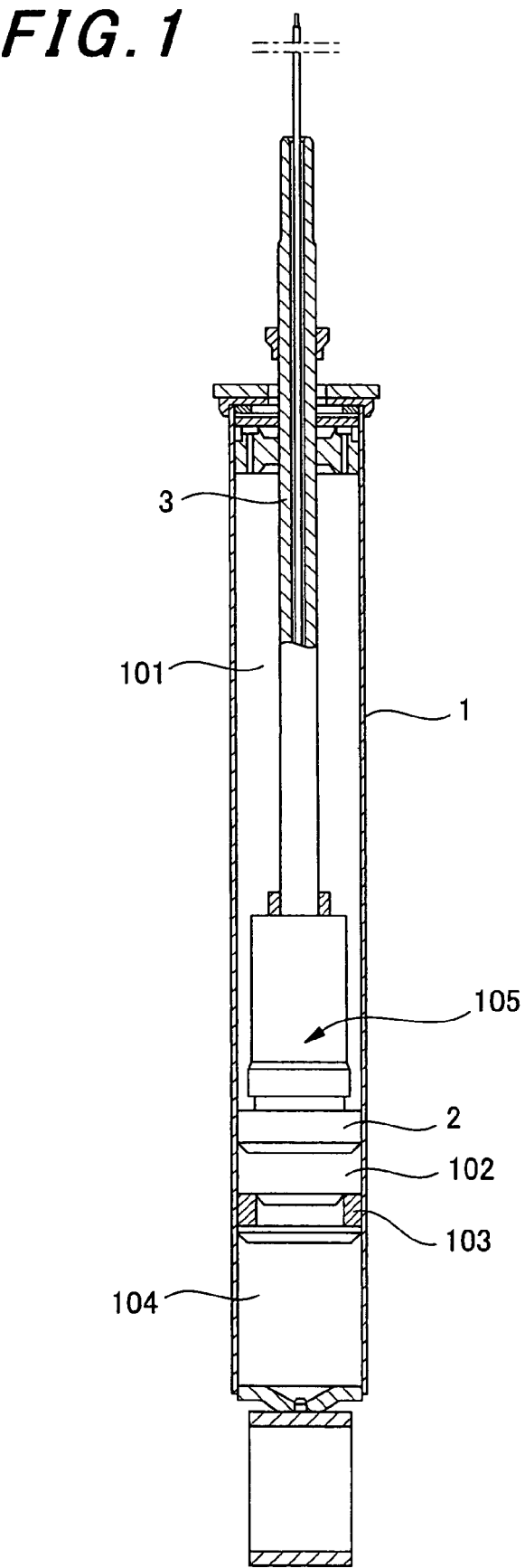
FIG. 1 is a longitudinal cross-sectional front view of a hydraulic shock absorber according to this invention.

As shown in FIG. 1, a hydraulic shock absorber according to this invention is equipped with a cylinder 1, a piston 2 slidably disposed in the cylinder 1, and a piston rod 3 coupled to the piston 2.

The inside of the cylinder 1 is divided into a first oil chamber 101 and a second oil chamber 102 by the piston 2. Further, a free piston 103 is disposed in the cylinder 1, and a gas chamber 104 is thereby defined. A piston valve 105 for controlling a damping force of the hydraulic shock absorber is provided in the piston 2.

Figure 2:
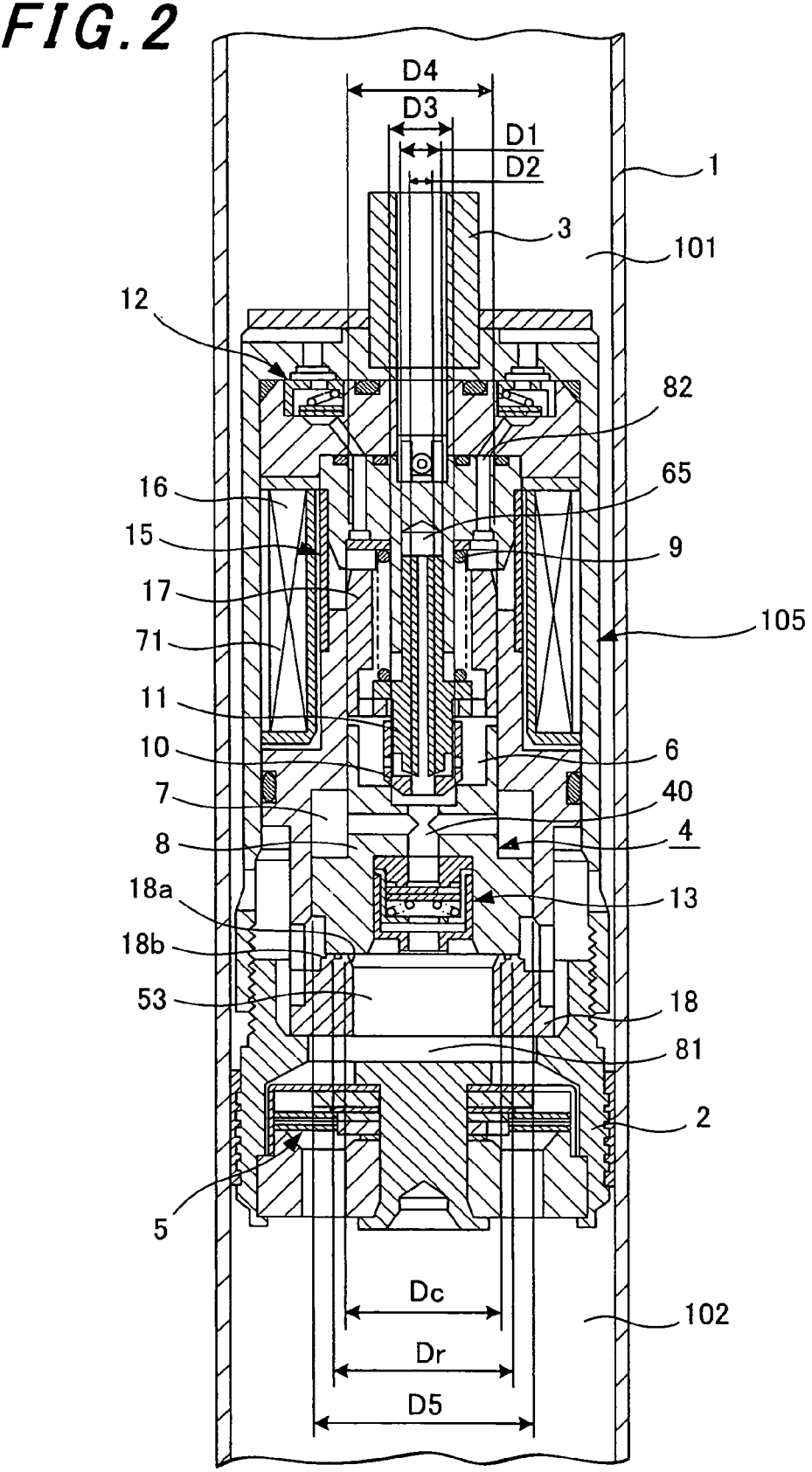
FIG. 2 is a partially enlarged cross-sectional view showing a dimensional relationship in an essential part around a piston valve of FIG. 1.
Figure 3:
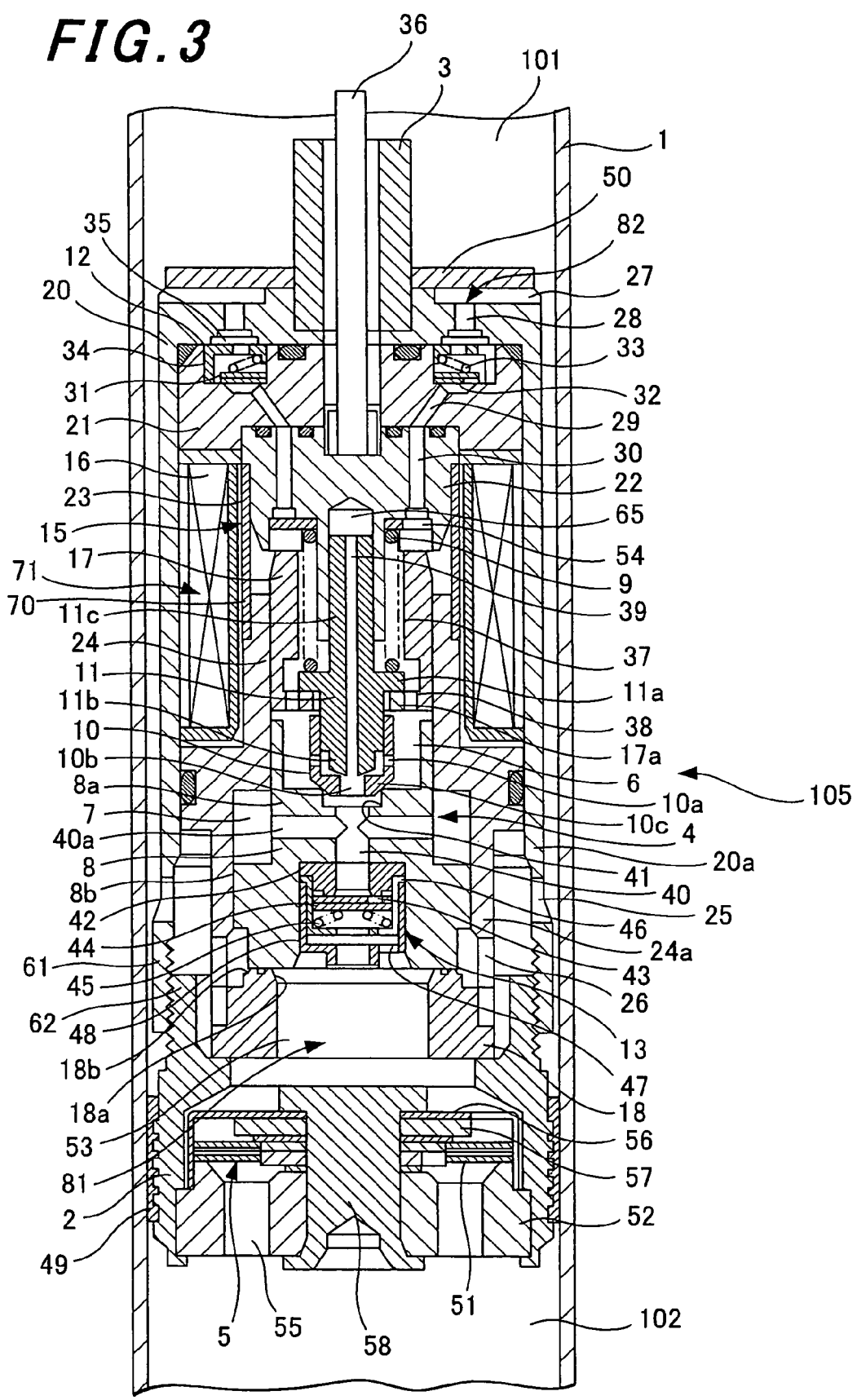
FIG. 3 is also a partially enlarged cross-sectional view showing the piston valve in detail.

FIGS. 2 and 3 are cross-sectional views each showing the hydraulic shock absorber in a part around the piston valve 105. Although FIGS. 2 and 3 are substantially identical to each other, a dimensional relationship among respective components is described in FIG. 2.

A concrete description will be given hereinafter referring mainly to FIG. 3.

A cylindrical housing 20 is coaxially coupled to a tip of the piston rod 3. A cap 21, a guide 22, a filler pipe 23 made of a nonmagnetic material, a guide 24, and a disc 18 are inserted into the housing 20 sequentially downward from above and concentrically with one another. In this state, threaded portions 61 and 62 of the piston 2 and the housing 20 are screwed and fastened together, so the respective components are fixed to one another.

Among these components, a fitting portion between the guide 22 located above and the filler pipe 23 and a fitting portion between the filler pipe 23 and the guide 24 located below are firmly fixed through welding or the like, so a guide assembly 70 is constituted to ensure airtightness.

A cylinder portion 20a forming a lower part of the housing 20 and a cylinder portion 24a of the guide 24 are provided with a passage 25 and a passage 26, respectively. These passages 25 and 26 communicate with a passage 53 made through a central portion of the disc 18, thereby constituting a main passage 81. The passage 25 opens to the oil chamber 101 located above, and the passage 53 communicates with the oil chamber 102 located below.

The main passage 81 is opened and closed by a main valve 4, which is composed of the disc 18 and a spool 8 seated thereon. This main valve 4 controls a damping force generated in an extension stroke of the hydraulic shock absorber and a damping force generated in a compression stroke of the hydraulic shock absorber, respectively.

A rebound stopper 50 centered by the piston rod 3 is fitted on a top face of the housing 20. A plurality of grooves are radially formed around the piston rod 3 in an upper end face of the housing 20. A passage 27 is formed between these grooves and the rebound stopper 50. The housing 20 is also provided with a passage 28 leading from the passage 27 to the inside of the housing 20. In addition, the cap 21 is fitted therein with a check valve 12 to be described later and provided with a passage 29 connected to the check valve 12. The passage 28 is connected to the check valve 12. The passage 29 communicates with a passage 30 made through the guide 22. The passages 27, 28, 29, and 30, which will be described later in detail, form a pilot passage 82 for introducing pilot pressure thereinto.

The check valve 12 is constructed by sequentially inserting a leaf valve 31, a notched leaf valve 32, and a non-return spring 33 into an annular groove in the top face of the cap 21 and press-fitting a valve cap 34 into the cap 21. A filter 35 is installed in an annular passage between the check valve 12 and the housing 20.

In principle, this check valve 12 prevents hydraulic oil from flowing from the oil chamber 101 side to the pilot passage 82 while allowing it to flow in the opposite direction. However, the check valve 12 allows a minute amount of hydraulic oil to flow from the oil chamber 101 to the pilot passage 82 through a notch of the notched leaf valve 32 as an orifice.

A notched plate 54 having a notch serving as an oil path, a spring 9 for applying an urging force to poppet valves 10 and 11, the poppet valve 11, a plunger 17, the poppet valve 10, and the spool 8 are inserted in the guide assembly 70.

A solenoid 71 is disposed outside the guide assembly 70. The solenoid 71 is equipped with a coil 16 connected to a harness 36. When the coil 16 is energized, the solenoid 71 operates so as to allow the plunger 17 to be attracted to the guide 22 through a magnetic force and thereby to reduce an initial load of the spring 9. The solenoid 71 will be described later in detail.

The plunger 17 can slide along an inner periphery of the cylindrical guide 24. A collar portion 11a of the poppet valve 11 abuts on a flange portion 17a protruding into a cylindrical portion of the plunger 17. When the plunger 17 moves upward, the poppet valve 11 moves as well simultaneously.

An annular passage 37 is formed between an inner periphery of the cylindrical portion of the plunger 17 and an outer periphery of a cylindrical portion in a lower part of the guide 22, and the flange portion 17a of the plunger 17 on which the collar portion 11a of the poppet valve 11 abuts is provided with a passage 38. These passages 37 and 38, which constitute part of the pilot passage 82, communicate with a extension-side pilot chamber 6 to be described later.

A tip of the poppet valve 11 is disposed inside the other poppet valve 10, which is disposed coaxially therewith. The tip of the poppet valve 11 is seated on a seat portion of the poppet valve 10. The poppet valve 11 moves alone against the spring 9, or moves together with the poppet valve 10 while being seated thereon.

A seat hole portion 10b is bored through a center of the poppet valve 10. A part around an opening of the seat hole portion 10b serves as the seat portion, on which a tapered valve head portion 11b of the poppet valve 11 is seated. A cylinder portion of the poppet valve 10 is provided with a port 10a.

The poppet valve 11 has a cylinder portion 11c extending oppositely to the valve head portion 11b. The cylinder portion 11c is slidably inserted in an inner periphery of the cylindrical guide 22. A back pressure chamber 65 is formed between the guide 22 and the poppet valve 11.

A communication hole 39 is provided so as to penetrate a central portion of the poppet valve 11. The communication hole 39 communicates at one end thereof with the back pressure chamber 65, and at the other end thereof with the seat hole portion 10b.

The cylinder portion 11c of the poppet valve 11 inserted in the guide 22 has an outer diameter that is set larger than a bore diameter of the seat portion of the poppet valve 10 (seat diameter of the poppet valve 11). In other words, as shown in FIG. 2, there is established a relationship: D1>D2 given that D1 and D2 represent the outer diameter of the cylinder portion 11c of the poppet valve 11 and the diameter of the seat hole portion of the poppet valve 10 (seat diameter of the poppet valve 11), respectively.

The spool 8, which is formed of a small-diameter portion 8a and a large-diameter portion 8b, assumes a staged shape. This spool 8 is slidably inserted in the guide 24, which also has an inner peripheral face assuming a staged shape. A compression-side pilot chamber 7, which is located at a staged portion and will be described later in detail, is defined between the spool 8 and the guide 24.

It is assumed that the small-diameter portion 8a of the spool 8 has an outer diameter D4 and that the large-diameter portion 8b of the spool 8 has an outer diameter D5.

A passage 40 is formed so as to penetrate the spool 8 along its central axis. The passage 40 is connected at an upper end thereof to a seat hole portion 41 on which a valve head portion 10c of the poppet valve 10 is seated. The extension-side pilot chamber 6 is defined between an upper part of the small-diameter portion 8a of the spool 8 and the inner periphery of the guide 24 on the one hand and the poppet valve 10 on the other. The extension-side pilot chamber 6 communicates with the check valve 12 side via the passages 37 and 38, so pressure is transmitted from the first oil chamber 101 to the extension-side pilot chamber 6.

In the spool 8, a diameter D3 of the seat hole portion 41 on which the poppet valve 10 is seated is larger than the outer diameter D1 of the cylinder portion 11c of the poppet valve 11. In other words, there is set a relationship: D3>D1.

The small-diameter portion 8a of the spool 8 is provided with a pilot pressure introduction hole 40a through which the passage 40 communicates with the compression-side pilot chamber 7.

A check valve 13, which is composed of a disc 42, a notched leaf valve 43, a leaf valve 44, a non-return spring 45, a cap 46, a filter 47, and a holder 48, is disposed in the passage 40 of the spool 8.

The check valve 13 prevents hydraulic oil from flowing from the oil chamber 102 toward the passage 40 while allowing it to flow in the opposite direction. However, the check valve 13 allows a minute amount of hydraulic oil to flow from the oil chamber 102 to a part upstream of the seat hole portion 41 of the spool 8 through a notch of the notched leaf valve 43 as an orifice.

The disc 18 is provided, at a portion thereof abutting on an end face of the spool 8, with two seat portions, namely, an inner seat portion 18a and an outer seat portion 18b. As shown in FIG. 5, a stamped orifice 18c is formed by stamping so as to extend across a gap between these two seat portions, namely, the inner seat portion 18a and the outer seat portion 18b, and communicates with the inside of the seat portion 18a and the outside of the seat portion 18b. When the spool 8 is seated on the inner seat portion 18a and the outer seat portion 18b of the disc 18, an extension-side equivalent effective diameter Dr and a compression-side equivalent effective diameter Dc of the seat portions exist between the two seat portions, namely, the inner seat portion 18a and the outer seat portion 18b.

A pressure-receiving portion to which a pressure in the oil chamber 101 is applied from a bottom face of the disc 18 of the main valve 4 in a valve-opening direction of the spool 8 in the extension stroke is equal in area to a part outside the outer seat portion 18b of the spool 8, in other words, an annular part between the outer diameter D5 of the large-diameter portion 8b of the spool 8 and the equivalent effective diameter Dr. On the other hand, in the case where the poppet valves 10 and 11 are closed, a pressure-receiving portion to which the same pressure as mentioned above (extension-side pilot pressure) is applied in a valve-closing direction of the spool 8, in other words, in such a direction as to press the spool 8 against the disc 18 is equal in area to an annular part between the outer diameter D4 of the small-diameter portion 8a of the spool 8 and the seat diameter D2 of the poppet valve 11.

A pressure-receiving portion to which a pressure on the oil chamber 102 side is applied similarly in the valve-opening direction of the spool 8 in the compression stroke is equal in area to a part inside the seat portion 18a of the spool 8, more precisely, an annular part corresponding to subtraction of the seat hole diameter D3 of the poppet valve 10 from the equivalent effective diameter Dc of the seat portion 18a. On the other hand, in the case where the poppet valves 10 and 11 are closed as described above, a pressure-receiving portion to which the same pressure as mentioned above on the oil chamber 102 side (compression-side pilot pressure) is applied in the valve-closing direction of the spool 8 is equal in area to an annular part of a staged portion surrounded by the outer diameter D4 of the small-diameter portion 8a of the spool 8 and the outer diameter D5 of the large-diameter portion 8b of the spool 8.

In this invention, the areas of the pressure-receiving portions of the spool 8 in the extension stroke and the compression stroke satisfy relationships among dimensions of respective diameters: $D4^2 - D2^2 > D5^2 - Dr^2$ and $D5^2 - D4^2 > Dc^2 - D3^2$, to constantly urge the spool 8 toward the disc 18 at the pressure in the oil chamber 101 or the oil chamber 102, in other words, to keep the spool 8 closed when the poppet valves 10 and 11 are closed.

A Teflon band 49 is wound around an outer peripheral face of the piston 2 in a part sliding along the cylinder 1 to reduce a sliding resistance. A damping valve 5 for generating a small damping force is fixed inside the piston 2. This damping valve 5 and the main valve 4 are arranged in series in the main passage 81. Accordingly, the damping force generated by the shock absorber is equal to the sum of the damping forces of the main valve 4 and the damping valve 5, which are arranged in series.

The damping valve 5 is equipped with a disc 52, which is fixed to an inner periphery of the piston 2 by caulking. A cap 56 having a partially notched outer periphery and a support 57 located inside the cap 56 are fixed to the disc 52 by a center guide 58. A plurality of laminated leaf valves 51, whose outer peripheries are guided by the cap 56, are sandwiched between the disc 52 and the support 57. The leaf valves 51 have outer peripheral portions whose bottom faces are supported by the disc 52, and inner peripheral portions whose top faces are supported by the support 57.

Thus, the inner peripheral portions of the leaf valves 51 bend downward to allow hydraulic oil to flow from the main passage 81 toward the second oil chamber 102 side in the extension stroke of the shock absorber, and the outer peripheral portions of the leaf valves 51 bend upward to allow hydraulic oil to flow from the second oil chamber 102 to the main passage 81 in the compression stroke of the shock absorber. At this moment, the leaf valves 51 generate a relatively small damping resistance for the flow of hydraulic oil in either direction.

The disc 52 is provided with a hole 55, which constitutes the main passage 81 through which oil flows. Although not shown in the drawings, orifices for bypassing the leaf valves 51 may be provided when a certain characteristic is required as is the case with valves of a normal shock absorber.

Next, an operation will be described.

First of all, the operation in the case where no current flows through the coil 16 of the solenoid 71 will be described.

In the extension stroke of the shock absorber, in which the piston rod 3 operates in such a direction as to be drawn, the oil chamber 101 is compressed due to an upward movement of the piston 2, and the oil chamber 102 is enlarged. Thus, the pressure in the oil chamber 101 on the compression side rises, and the pressure in the oil chamber 102 on the enlarged side lowers. For the sake of convenience, however, it will be assumed in the following description that the pressure in the oil chamber 102 on the enlarged side is zero. This will hold true in the later description of the compression stroke as well.

When the piston 2 moves at a low speed, the pressure in the oil chamber 101 rises but does not become considerably high. The pressure in the oil chamber 101 is transmitted from the check valve 12 to the pilot passage 82 and the extension-side pilot chamber 6, acts on the poppet valve 11, and operates in the valve-opening direction of the poppet valve 11.

However, while the aforementioned pressure is lower than cracking pressure (valve-opening pressure) of the poppet valve 11, the poppet valve 11 is closed. The poppet valve 11 is urged in the valve-closing direction by the spring 9.

At this moment, the same pressure as in the oil chamber 101, which has been transmitted to the extension-side pilot chamber 6, operates in such a direction as to press the spool 8 against the disc 18. On the other hand, the same pressure as in the oil chamber 101 is introduced to the part outside the seat portion 18a of the disc 18 from the bottom face of the spool 8 via the passages 25 and 26, thereby pressing the spool 8 upward.

However, the relationship: $D4^2 - D2^2 > D5^2 - Dr^2$ is established between the areas of the pressure-receiving portions of the top face and the bottom face of the spool 8 at this moment as described above, and a large force is applied to the spool 8 to press it downward. Therefore, the spool 8 remains closed.

In this state, hydraulic oil in the oil chamber 101 flows from the passages 25 and 26 as the main passage 81 to the passage 53 inside the disc 18 through the stamped orifice 18*c* formed in the seat portions 18*a* and 18*b* of the disc 18. In addition, the hydraulic oil flows to the oil chamber 102 while bending inner periphery sides of the leaf valves 51 of the damping valve 5 downward. At this moment, there is created a difference in pressure between the oil chamber 101 and the oil chamber 102 due to a resistance at the time when the oil flows through the orifice 18*c* and the damping valve 5, so resistance force acting against such a direction as to pull the piston rod 3 upward, namely, extension-side damping force is generated.

When the speed of the piston 2 increases, the pressure loss in the orifice 18*c* increases. As the pressure loss in the orifice 18*c* increases, the pressure in the oil chamber 101 rises, and the same pressure as in the oil chamber 101 is applied to the extension-side pilot chamber 6. When the pressure in the extension-side pilot chamber 6 reaches the cracking pressure of the poppet valve 11, the poppet valve 11 overcomes the urging force of the spring 9 and then is lifted.

As a result, the hydraulic oil in the extension-side pilot chamber 6 flows to the passage 53 inside the disc 18 via the port portion 10*b* and the passage 40 while opening the check valve 13.

In this case, even when the pressure in the oil chamber 101 further increases, the notch of the notched leaf valve 32 of the check valve 12 serves as an orifice, thereby allowing only a minute amount of hydraulic oil to flow from the oil chamber 101 to the pilot passage 82. Owing to the pressure loss caused at this moment, the pressure in the extension-side pilot chamber 6 does not become equal to the pressure in the oil chamber 101 as in the case where the poppet valve 11 is closed, and is adjusted so as to remain equal to the cracking pressure of the poppet valve 11, which is lower than the pressure in the oil chamber 101.

Even when the poppet valve 11 is opened, the pressure in the passage 40 is as low as the pressure in the passage 53, so the poppet valve 10 remains pressed against the seat portions.

In this manner, after the poppet valve 11 has been opened, the spool 8 is pressed against the disc 18 due to the pilot pressure in the extension-side pilot chamber 6, which is maintained at the cracking pressure of the poppet valve 11.

When it is now assumed that Pa and Ppb represent the pressure in the oil chamber 101 and the cracking pressure of the poppet valve 11, respectively, the spool 8 remains closed while being constantly urged toward the disc 18 as long as there is established a relationship: $Ppb \cdot (D4^2 - D2^2) > Pa \cdot (D5^2 - Dr^2)$.

However, when the speed of the piston 2 and the pressure in the oil chamber 101 further increase to establish a state of $Ppb \cdot (D4^2 - D2^2) < Pa \cdot (D5^2 - Dr^2)$, the force applied to the extension-side pressure-receiving face from the bottom face of the spool 8 overcomes the urging force resulting from the pilot pressure applied to the extension-side pilot chamber 6. As a result, the spool 8 separates from the seat portion 18*a* of the disc 18.

The hydraulic oil in the oil chamber 101 thereby flows through the passages 25 and 26 and the gap between the spool 8 and the disc 18, namely, the opening portion of the main valve 4 and to the passage 53, and then to the oil chamber 102 while bending the insides of the leaf valves 51 of the damping valve 5. The damping force at this moment is generated as the sum of the damping force of the main valve 4 and the damping force of the damping valve 5. It should be noted that the set damping force of the damping valve 5 is smaller than that of the main valve 4, so the damping force generated by the main valve 4 is dominant as a damping force in the extension stroke.

On the other hand, in the compression stroke of the shock absorber, the piston 2 moves downward, and hydraulic oil flows from the compressed oil chamber 102 to the passage 53 while pressing outer peripheral sides of the leaf valves 51 of the damping valve 5 upward. The hydraulic oil flows through a notch portion of the notched leaf valve 43 of the check valve 13 and the passage 40, and presses the poppet valve 10 upward to open the poppet valve 10. However, when the piston 2 moves at a low speed, the pressure in the oil chamber 102 is low, and the poppet valve 10 is urged in the valve-closing direction via the poppet valve 11 by the spring 9. Therefore, the poppet valve 10 remains closed instead of being opened.

In this case, a pressure is also applied to the poppet valve 11 in the valve-opening direction thereof, but the back pressure chamber 65 of the poppet valve 11 communicates with the passage 40, and therefore the pressure in the chamber 65 is at the same pressure level as the pressure applied to the poppet valve 10. The relationship: D1>D2 is established between the seat diameter D2 of the poppet valve 11 and the inner diameter D1 of the back pressure chamber 65, so the poppet valve 11 is constantly pressed against the poppet valve 10 without being opened.

In this state, the pressure introduced into the compression-side pilot chamber 7 from the passage 40 is equal to the pressure in the passage 53, so there is generated force acting to press the spool 8 against the disc 18. The same pressure is also applied to the compression-side pressure-receiving face of the bottom face of the spool 8 to press the spool 8 upward to open the spool 8, but the relationship in area: $(D5^2 - D4^2) > (Dc^2 - D3^2)$ is established, and therefore the force acting to press the spool 8 against the disc 18 overcomes the aforementioned upward force, so the spool 8 remains closed.

In this state, hydraulic oil flows from the passage 53 as the main passage 81, through the stamped orifice 18*c* formed through the seat portions 18*a* and 18*b* of the disc 18, through the passages 26 and 25, and then to the oil chamber 101 on the enlarged side. At this moment, the hydraulic oil flows through the orifice 18*c* and the damping valve 5, so there is created a difference in pressure between the oil chamber 102 and the oil chamber 101. As a result, there is generated a compression-side damping force, which acts against a force acting to press the piston rod 3 downward.

When the speed of the piston increases, the pressure loss in the orifice 18*c* increases. With the increase, the pressures in the oil chamber 102, the passage 53, the passage 40, and the compression-side pilot chamber 7 also rise identically.

When the pressure in the passage 40, which is equal to the pressure in the compression-side pilot chamber 7, reaches the cracking pressure of the poppet valve 10, the pressure in the passage 40 overcomes the urging force of the spring 9. Consequently, the poppet valve 10 is lifted integrally with the poppet valve 11 and then opened.

Thus, hydraulic oil in the passage 40 flows from the open poppet valve 10 to the extension-side pilot chamber 6, flows through the passages 38, 37, and 30 to be the pilot passage 82, presses the check valve 12 open, and then flows to the oil chamber 101 via the passages 28 and 27. It should be noted that, even when the pressure in the oil chamber 102 further rises and the pressure in the passage 53 becomes higher, the notch of the notched leaf valve 43 of the check valve 13 serves as an orifice to regulate a flow rate of hydraulic oil, and causes a pressure loss. Therefore, the pressure in the passage 40 downstream of the check valve 13 is constantly adjusted to the cracking pressure of the poppet valve 10.

At this moment, the pressure in the compression-side pilot camber 7 is also maintained at the same pressure as the cracking pressure. The force acting to press the spool 8 against the disc 18 operates due to the compression-side pilot pressure. On the other hand, the pressure in the passage 53 on the oil chamber 102 side is applied to the pressure-receiving face of the bottom face of the spool 8, thereby pressing the spool 8 upward.

When it is herein assumed that Pb and Ppa represent the pressure in the passage 53 and the cracking pressure of the poppet valve 10, respectively, the force acting to press the spool 8 downward is dominant as long as there is established a relationship: $Ppa \cdot (D5^2 - D4^2) > Pb \cdot (Dc^2 - D3^2)$. As a result, the spool 8 is constantly pressed against the disc 18, and the main valve 4 remains closed.

However, when the speed of the piston further increases and the pressure Pb in the oil chamber 102 and the passage 53 rises to establish a state of $Ppa \cdot (D5^2 - D4^2) < Pb \cdot (Dc^2 - D3^2)$, the force applied to the pressure-receiving face of the bottom face of the spool 8 overcomes the urging force resulting from the pilot pressure. In consequence, the spool 8 separates from the seat portion 18a of the disc 18.

Then, hydraulic oil in the oil chamber 102 presses the outsides of the leaf valves 51 of the damping valve 5 open, and flows from the passage 53 as the main passage 81, through the opening portion between the spool 8 and the disc 18, and then to the oil chamber 101 via the passages 26 and 25. The damping force at this moment mainly depends on the main valve 4, thereby exhibiting hard damping force characteristics.

In this manner, according to this invention, the generated damping force can be controlled based on the cracking pressures of the poppet valves 10 and 11, namely, the pilot pressures, with respect to both the extension stroke and the compression stroke.

Next, description will be given as to a case where a current is caused to flow through the coil 16 of the solenoid 71, which affects the cracking pressures of the poppet valves 10 and 11.

When a current is caused to flow through the coil 16, a magnetic force is generated around the coil 16. The magnitude of this magnetic force changes depending on the magnitude of the current.

The magnetic force is generated in a loop passing through the guide 22, the cap 21, the housing 20, the guide 24, and the plunger 17. Since there is a gap between the guide 22 and the plunger 17, a suction force acts to attract the plunger 17 toward the guide 22 through the magnetic force.

This suction force is transmitted from the flange portion 17a of the guide 17 to the collar portion 11a of the poppet valve 11, and acts in such a direction as to contract the spring 9. An initial force is applied to the spring 9. Therefore, as long as the suction force does not exceed the initial force, the spring 9 does not yield, and the poppet valve 11 remains closed. However, a force obtained by subtracting the suction force from the initial force of the spring 9 is applied to the poppet valve 11 as an urging force in the valve-closing direction. This means that the urging force of the spring 9 is reduced.

Thus, the cracking pressure of the poppet valve 11 decreases in the extension stroke of the shock absorber, and the cracking pressure of the poppet valve 10 decreases in the compression stroke of the shock absorber. As a result, the spool 8 of the main valve 4 starts being lifted at lower pressure in the oil chamber 101 in the extension stroke, or the spool 8 starts being lifted at lower pressure in the oil chamber 102 is lower in the compression stroke.

The pressure at the time when the spool 8 starts being lifted changes depending on the value of the current caused to flow through the coil 16. When a larger current is caused to flow therethrough, a larger magnetic force is generated. As a result, the cracking pressures of the poppet valves 10 and 11 decrease, and the pressure acting to open the spool 8 decreases. In this manner, the damping force generated by the main valve 4 changes depending on the magnetic force generated by the coil 16.

Figure 4:
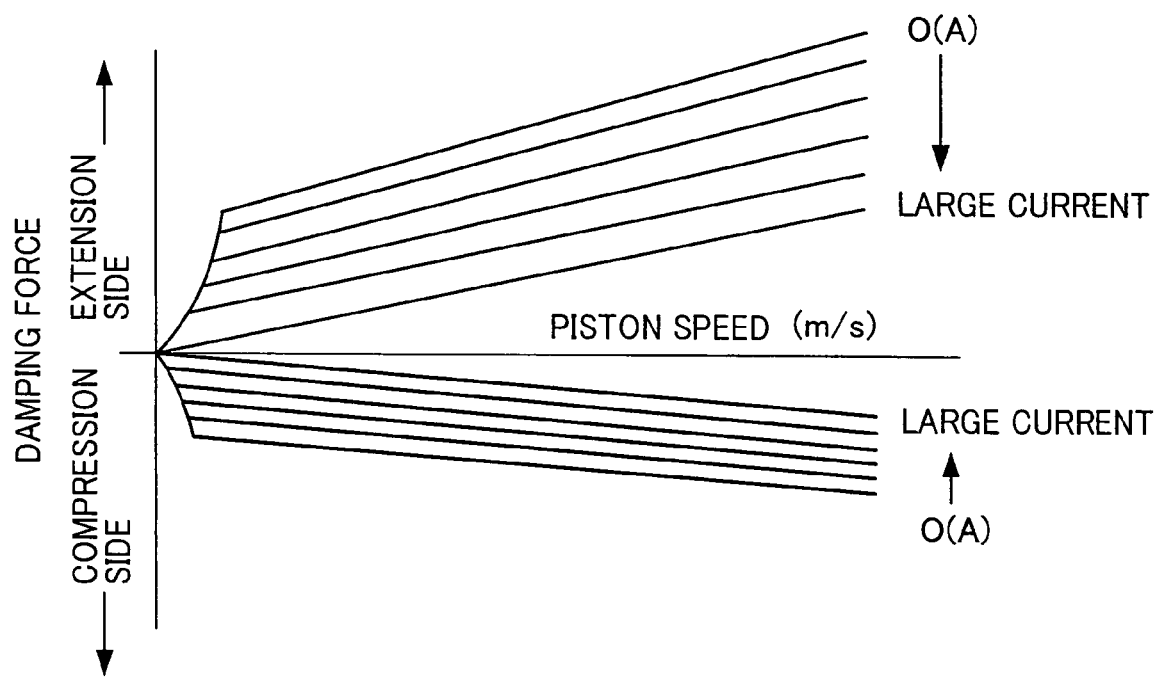
FIG. 4 is a characteristic diagram showing characteristics of a damping force generated by the hydraulic shock absorber.

FIG. 4 illustrates a relationship between the magnitude of a current supplied to the coil 16 and a generated damping force. An axis of ordinate in FIG. 4 indicates the magnitude of the damping force, and an axis of abscissa in FIG. 4 indicates the speed of the piston.

When a current value is set such that the suction force generated by the coil 16 of the solenoid 71 becomes equal to the initial force of the spring 9, the smallest damping force is obtained. On the other hand, the largest damping force is obtained when no current is caused to flow through the coil 16. By continuously changing the current value therebetween, the damping force is also continuously changed in accordance the change in the current value.

As described above, according to this invention, the extension-side pilot chamber 6 and the compression-side pilot chamber 7, which are independent of each other, are provided on the back face side of the spool 8, and the two poppet valves 10 and 11, which are opened and closed at cracking pressures that are independent of each other, are provided. Also, the cracking pressures of these two poppet valves 10 and 11 are controlled by the single solenoid 71. Thus, the variable range of the damping force can be set wide not only in the extension stroke but also in the compression stroke, and the variable range of the damping force in the extension stroke and the variable range of the damping force in the compression stroke can be set independently of each other based on an exciting current flowing through the solenoid 71.

Next, the disc 18 of the main valve 4 is equipped with the two seat portions, namely, the inner seat portion 18a and the outer seat portion 18b as described above.

Figure 5A:
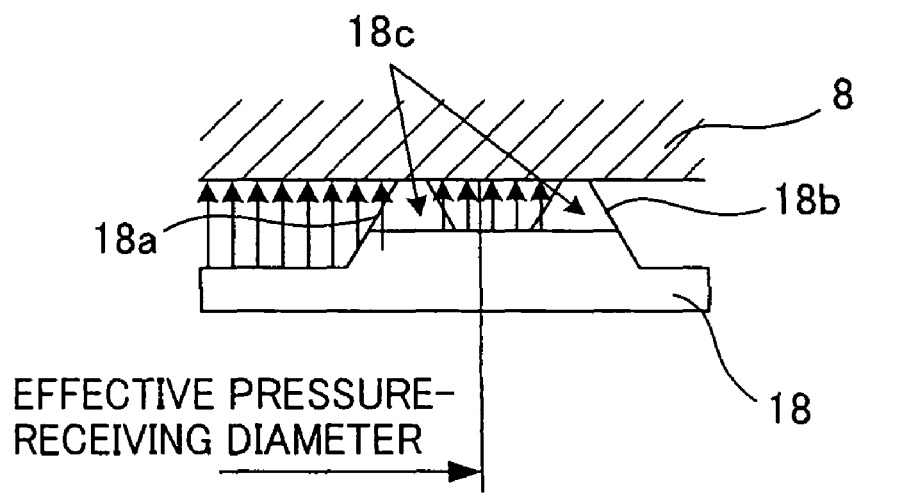
FIGS. 5(A) and 5(B) are partially enlarged cross-sectional views each showing a seat portion of a main valve to explain a relationship between pressures applied to the seat portion.
Figure 5B:
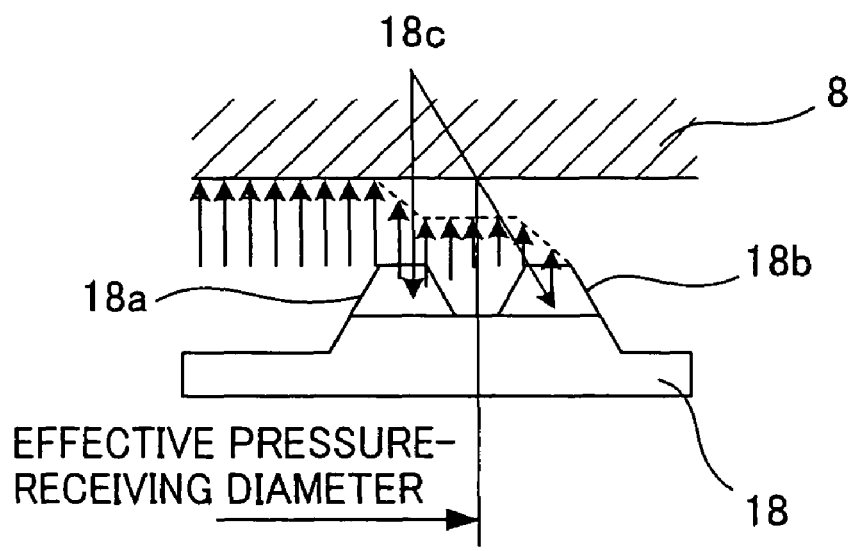
Figure 6A:
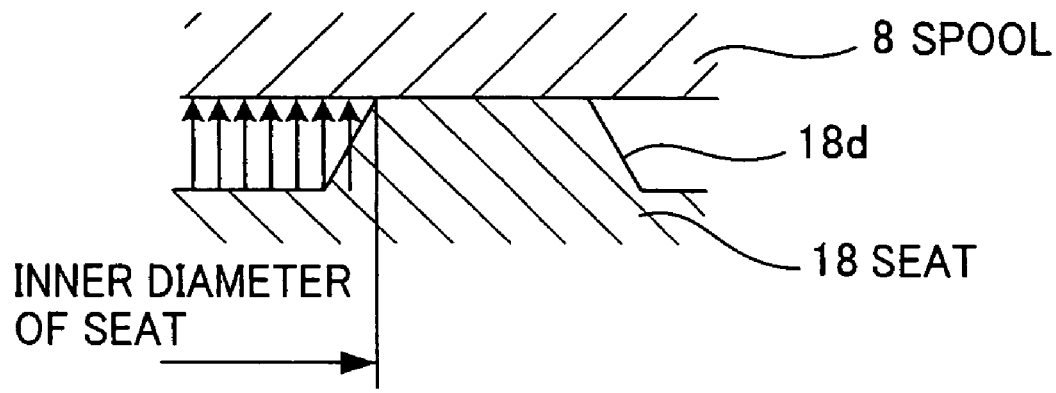
FIGS. 6(A) and 6(B) are also partially enlarged cross-sectional views each showing the seat portion to explain a relationship between pressures applied to the seat portion in a case where the seat portion has no stamped orifice.
Figure 6B:
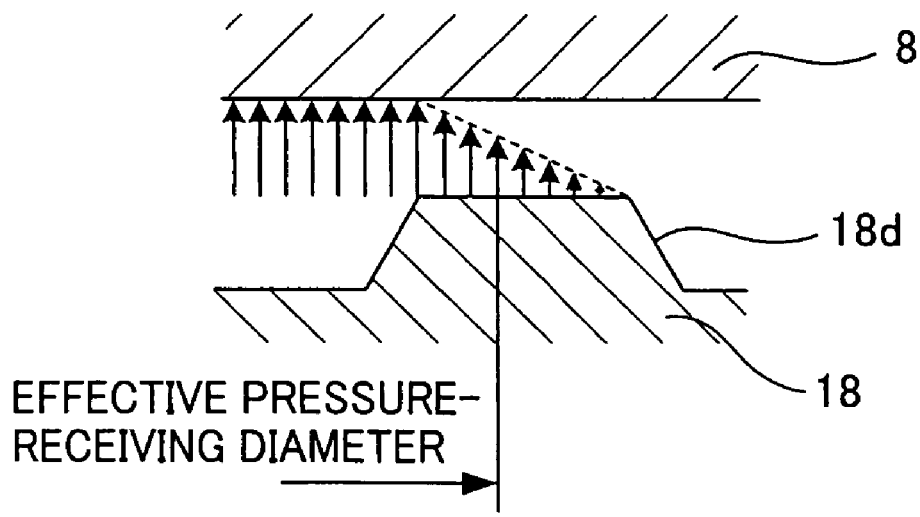

FIGS. 5(A) and 5(B) show a change in pressure in the vicinity of each of the seat portions 18a and 18b in the compression stroke in which high pressure is applied to the inner peripheral side of the seat portion, in a case where the stamped orifice 18c is provided so as to extend across the gap between the two seat portions 18a and 18b. FIGS. 6(A) and 6(B) show a change in pressure in the vicinity of a single seat portion 18d in the compression stroke in which high pressure is applied to the inner peripheral side of the seat portion, in a case where there is no stamped orifice provided in addition to the single seat portion 18d.

FIG. 6(A) shows a state in which the spool 8 has not been opened. The spool 8 abuts on the seat portion 18d of the disc 18, so the effective pressure-receiving diameter, which represents a diameter of a part to which pressure is applied, is equal to the inner diameter of the seat portion 18d.

On the other hand, in a state in which the spool 8 has been opened as shown in FIG. 6(B), the outer diametral position of the seat portion 18d is located on a downstream side of the inner diametral position thereof. Therefore, a decrease in pressure is observed as the distance from a downstream side decreases, and there is generated a pressure gradient on a seat face of the seat portion 18d. In this case, the effective pressure-receiving diameter is larger than the inner diameter of the seat portion 18d. The spool 8 moves according to the balance of a force applied to the pressure-receiving face thereof. Therefore, when the effective pressure-receiving diameter increases after the spool 8 is opened, the pressure to be balanced decreases correspondingly. In consequence, fluctuations in damping force are caused immediately after the spool 8 has been opened.

Accordingly, it is preferable that the effective pressure-receiving diameter of the spool 8 have a narrow fluctuation range between the state in which the spool 8 has not been opened and the state in which the spool 8 has been opened.

In the case of FIGS. 5(A) and 5(B), the orifice 18c is formed by stamping across the gap between the two seat portions 18a and 18b, so the seat portions 18a and 18b communicate with each other. Thus, the effective pressure-receiving diameter exists between the two seat portions 18a and 18b when the spool 8 has not been opened, and even after the spool 8 has been opened.

The effective pressure-receiving diameter before the opening of the spool 8 and the effective pressure-receiving diameter after the opening of the spool 8 both exist between the inner seat portion 18a and the outer seat portion 18b, and thus are not equal to each other. However, the fluctuation range of the effective pressure-receiving diameter has a narrower fluctuation range in comparison with the case of FIG. 6. Therefore, the fluctuation range of a damping force can be made narrow while the spool 8 is being opened.

This invention is not limited to the foregoing embodiment thereof, but includes various improvements and modifications that can be made by those skilled in the art within the scope of a technical concept thereof.

INDUSTRIAL APPLICABLE OF THE INVENTION

The hydraulic shock absorber according to this invention can be used as a shock absorber of a suspension system for a vehicle.

What is claimed is:

1. A hydraulic shock absorber having: a cylinder filled with hydraulic oil; a piston disposed slidably within the cylinder, for dividing an inside of the cylinder into a first oil chamber and a second oil chamber; and a main valve composed of a spool and a disc on which the spool is seated, the main valve being provided on the piston and disposed in a main passage through which the first oil chamber and the second oil chamber communicate with each other, the absorber comprising:

an extension-side pilot chamber formed in a back face of the spool, for urging the spool in a valve-closing direction through a pilot pressure introduced via a first orifice from the either oil chamber which is at high pressure in an extension stroke;

a compression-side pilot chamber formed in the back face of the spool, for urging the spool in the valve-closing direction through a pilot pressure introduced via a second orifice from the either oil chamber which is at high pressure in a compression stroke;

an extension-side pressure-receiving portion provided on the spool and having a smaller pressure-receiving area than the extension-side pilot chamber, for allowing pressure to be introduced into the extension-side pressure-receiving portion from an oil chamber which is at high pressure in the extension stroke and urging the spool in a valve-opening direction against the extension-side pilot pressure;

a compression-side pressure-receiving portion provided on the spool and having a smaller pressure-receiving area than the compression-side pilot chamber, for allowing pressure to be introduced into the compression-side pressure-receiving portion from an oil chamber which is at high pressure in the compression stroke and urging the spool in the valve-opening direction against the compression-side pilot pressure;

an extension-side poppet valve which opens when pressure in the extension-side pilot chamber reaches cracking pressure for holding the pilot pressure substantially below the cracking pressure;

a compression-side poppet valve which opens when pressure in the compression-side pilot chamber reaches cracking pressure for holding the pilot pressure substantially below the cracking pressure; and a solenoid for allowing a current to flow therethrough to be excited and applying an urging force in such a direction that the solenoid reduces initial loads of springs of the extension-side poppet valve and the compression-side poppet valve;

wherein the extension-side poppet valve and the compression-side poppet valve have a single common pilot passage for introducing a pilot pressure to each of the valves;

the pilot passage has a first check valve and a second check valve disposed in the pilot passage:

the first check valve and the second check valve are located upstream of the extension-side poppet valve and downstream of the compression-side poppet valve, respectively, open due to flow of hydraulic oil in opposite directions, and have the first orifice and the second orifice, respectively;

the compression-side poppet valve is seated on a seat hole portion of the spool;

the extension-side poppet valve is seated on a seat hole portion of the compression-side poppet valve;

the extension-side poppet valve and the compression-side poppet valve are equipped with a single spring for urging the extension-side poppet valve and the compression-side poppet valve in a valve-closing direction;

the extension-side poppet valve releases the extension-side pilot pressure via the seat hole portion of the compression-side poppet valve in moving away from the compression-side poppet valve and opening against the spring by the extension-side pilot pressure; and the compression-side poppet valve moves away from the seat hole portion of the spool integrally with the extension-side poppet valve to release the compression-side pilot pressure in opening against the spring by the compression-side pilot pressure.

2. The hydraulic shock absorber according to claim 1, wherein the first check valve and the second check valve are composed of a lamination of leaf valves and a lamination of notched leaf valves, respectively.

3. The hydraulic shock absorber according to claim 1, wherein:

the extension-side poppet valve has a back pressure chamber formed in a back face of the extension-side poppet valve;

the extension-side poppet valve has a cylinder portion slidably inserted in the back pressure chamber; and the back pressure chamber communicates with the seat hole portion of the spool through a through-passage penetrating the extension-side poppet valve in an axial direction.

4. The hydraulic shock absorber according to claim 3, wherein:

the compression-side poppet valve has a seat diameter that is larger than an outer diameter of the cylinder portion; and the outer diameter of the cylinder portion is larger than a seat diameter of the extension-side poppet valve.

5. The hydraulic shock absorber according to claim 3, wherein:
the extension-side poppet valve has a cylindrical plunger slidably disposed outside of the extension-side poppet valve coaxially with the extension-side poppet valve;
the extension-side poppet valve is engaged with the plunger by a spring for urging the extension-side poppet valve in the valve-closing direction;
the solenoid is disposed further outside of the plunger; and
the plunger generates an urging force in such a direction that the plunger acts against the spring when the solenoid allows a current to flow through the solenoid to be excited.

6. The hydraulic shock absorber according to claim 1, wherein:
the spool is formed as a staged spool composed of a large-diameter portion and a small-diameter portion;
the extension-side pilot chamber is formed facing the small-diameter portion; and
the compression-side pilot chamber is formed facing a staged portion between the large-diameter portion and the small-diameter portion.

7. The hydraulic shock absorber according to claim 1, wherein the main passage has a damping valve disposed in the main passage, which is set to generate a small damping force in series with the main valve.

8. The hydraulic shock absorber according to claim 1, wherein:
the disc of the main valve has double seat portions formed on the disc, namely, an inner seat portion and an outer seat portion as seat portions of the spool; and
the seat portions each have an orifice formed in the seat portions, through which an outside and an inside of each of the seat portions communicate with each other.

* * * * *